No. 648,028. Patented Apr. 24, 1900.
J. HOOPER, Dec'd.
THE COLUMBIA FINANCE & TRUST CO., Administrator.
DEVICE FOR PREVENTING MOUTH BREATHING.
(Application filed Aug. 7, 1899.)

(No Model.)

Witnesses:
D. W. Edelin.
J. E. Hutchinson Jr.

Inventor:
Josephine Hooper
By his attorneys
Eunice Goldsborough

UNITED STATES PATENT OFFICE.

JOSEPHUS HOOPER, OF LOUISVILLE, KENTUCKY; THE COLUMBIA FINANCE & TRUST CO., ADMINISTRATOR OF SAID HOOPER, DECEASED, ASSIGNOR OF ONE-HALF TO CURRAN POPE, OF SAME PLACE.

DEVICE FOR PREVENTING MOUTH-BREATHING.

SPECIFICATION forming part of Letters Patent No. 648,028, dated April 24, 1900.

Application filed August 7, 1899. Serial No. 726,354. (No model.)

*To all whom it may concern:*

Be it known that I, JOSEPHUS HOOPER, a citizen of the United States, residing at Louisville, in the county of Jefferson and State of Kentucky, have invented certain new and useful Improvements in Devices for Preventing Mouth-Breathing; and I do hereby declare the following to be a full, clear, and exact description of the invention, such as will enable others skilled in the art to which it appertains to make and use the same.

The object of the invention is to prevent or cure the habit of breathing through the mouth; and it consists of the hereinafter-described appliance to be worn between the front teeth and the lips during sleep, whereby the entrance of air into the mouth is prevented even though the lips be parted and a natural method of breathing through the nostrils is induced.

The invention is illustrated in the accompanying drawings, wherein—

Figure 1:
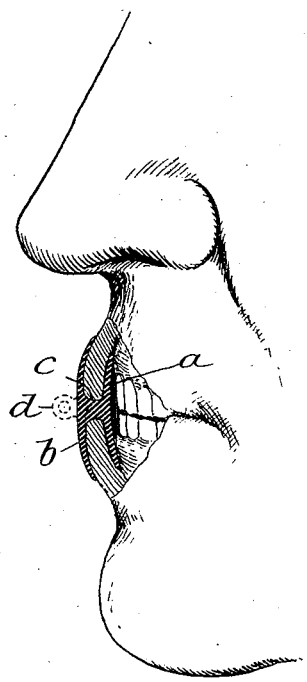
Figure 2:
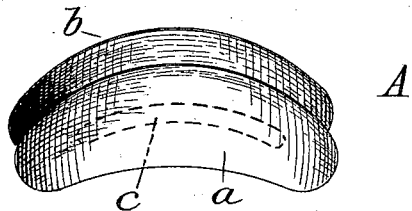

Figure 1 shows the front part of a human face with the lips broken away to show the device as applied in use. Fig. 2 is a perspective view of the appliance detached.

Referring to the views, A denotes the device as a whole. One part of the appliance consists of a thin member $a$, of pliable, yielding, and preferably elastic material, such as soft rubber, curved as shown in Fig. 2 and molded to shape to fit snugly against the front teeth and gums and to be embraced between them and the lips. The length of the member is slightly in excess of the width of the mouth, so as to close the corners, and it is of a width sufficient to extend across the opening between the lips and teeth onto the gums, so that even should the lips and teeth fall apart, as often happens during sleep, the edges of the member will still overlap both the upper and lower teeth and prevent the entrance of air between them. As illustrated in the drawings, the member is curved longitudinally and in cross-section, and the longitudinal curve is preferably on a shorter radius than the average contour of the teeth and gums, so that in adjusting the device to position in the mouth the straightening out lengthwise of the member will cause its upper and lower edges to hug more closely the surfaces of the gums. The other part of the appliance consists of an outer member $b$, similar in respect of material, construction, and shape to the member $a$ and joined to the latter along its median line by a fin or connection $c$ of sufficient height to properly space the two members apart and of a length somewhat less than that of the members themselves.

Although I have shown the two members as being practically of the same size, it is obvious that the outer one need not be as wide as the one between the teeth and gums. Indeed, the principal function of the outer member being to hold the device in place, any width of the same crosswise, so as to embrace the upper and lower lips, would be practicable.

If preferred, a small ring (shown in dotted lines at $d$) may be formed on the outer side of the appliance, through which a cord or string may be run in order to secure it against being lost, the string being conveniently tied around the neck or otherwise secured to the person.

The manner of applying and using the device is sufficiently illustrated in Fig. 1 to require no further description, it being obvious that the only thing necessary is to adjust the inner member between the front teeth and the lips, when the latter will be embraced between the two members and the device be held in position by a gentle elastic pressure.

It is characteristic of the device that the soft pliable material out of which it is made and its conformation in shape to the curved line of the teeth permit it to be worn without discomfort whether asleep or awake. It is, moreover, distinguished from hard plate-like devices by its automatic valve-like action, it being apparent that the inner member acts to prevent exhalation by fitting air-tight against the inner surface of the lips, and the outer member prevents inhalation by a similar action against the outside of the lips.

The conformation of the device to the curvature of the lips, teeth, and gums is also such as to prevent distortion of the mouth when in use, and the gentle pressure with which the two members embrace the lips offers, ordinarily, sufficient impediment to their falling apart to keep them closed in a natural position; but should they separate, notwithstanding, the device remains in position and the valve-like action of the members prevents breathing through the mouth as effectually as if the lips were closed.

Having thus described the invention, what I claim is—

1. A device for preventing breathing through the mouth, the same consisting of a member of soft, pliable material to fit between the teeth and the inner surface of the lips, and a similar member adapted to fit against the outer surface of the lips, said members being secured together along their median line.

2. A device for preventing breathing through the mouth, the same consisting of a thin member of soft, pliable, elastic material to fit between the teeth and the inner surface of the lips, and an auxiliary retaining member of similar material adapted to fit against the outer surface of the lips, said members being secured together along their median horizontal line, a distance substantially the width of the mouth.

In testimony whereof I affix my signature in presence of two witnesses.

JOSEPHUS HOOPER.

Witnesses:
J. A. GOLDSBOROUGH,
J. C. PENNIE.